United States Patent
Narasimha et al.

(10) Patent No.: US 10,123,345 B2
(45) Date of Patent: Nov. 6, 2018

(54) INTERFERENCE MITIGATION IN A DEVICE SUPPORTING MULTIPLE RADIO TECHNOLOGIES COMMUNICATING IN OVERLAPPING TIME PERIODS

(75) Inventors: Murali Narasimha, Lake Zurich, IL (US); Vijay Nangia, Algonquin, IL (US); Colin D. Frank, Park Ridge, IL (US); Hyejung Jung, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 184 days.

(21) Appl. No.: 12/976,117

(22) Filed: Dec. 22, 2010

(65) Prior Publication Data
US 2012/0164948 A1  Jun. 28, 2012

(51) Int. Cl.
| | |
|---|---|
| *H04W 72/12* | (2009.01) |
| *H04L 1/18* | (2006.01) |
| *H04W 24/10* | (2009.01) |
| *H04W 88/06* | (2009.01) |
| *H04L 1/00* | (2006.01) |

(52) U.S. Cl.
CPC ......... *H04W 72/1215* (2013.01); *H04L 1/188* (2013.01); *H04L 1/0026* (2013.01); *H04W 24/10* (2013.01); *H04W 88/06* (2013.01)

(58) Field of Classification Search
CPC ............. H04W 36/14; H04W 36/0088; H04W 36/0005; H04W 72/1215; H04W 24/10; H04W 88/06; H04B 7/0404; H04L 1/188; H04L 1/0026
USPC .......................... 455/63.1, 553.1, 426.1, 436
See application file for complete search history.

(56) References Cited

U.S. PATENT DOCUMENTS

| | | |
|---|---|---|
| 6,882,635 B2 | 4/2005 | Eitan et al. |
| 7,046,649 B2 | 5/2006 | Awater et al. |
| 7,454,171 B2 | 11/2008 | Palin |
| 7,545,787 B2 | 6/2009 | Bitran et al. |
| 7,643,463 B1 | 1/2010 | Linsky et al. |
| 7,664,085 B2 | 2/2010 | Waxman |
| 7,688,784 B2 | 3/2010 | Bitran et al. |

(Continued)

FOREIGN PATENT DOCUMENTS

WO    2008157800 A1    12/2008

OTHER PUBLICATIONS

3GPP TSG RAN WG2 #72bis, "Evaluation of Coexistence Interference" Motorola Mobility, Dublin, Ireland, Jan. 17-21, 2011, 4 pages.

(Continued)

*Primary Examiner* — Alejandro Rivero
(74) *Attorney, Agent, or Firm* — Faegre Baker Daniels LLP (57) ABSTRACT

A wireless terminal that supports operation on a first wireless technology and operation on a second wireless technology performs a first set of measurements on a received signal on first operating frequency of the first wireless technology, wherein the first set of measurements are performed during time periods that overlap time periods during which the wireless terminal transmits signals of the second wireless technology. The terminal also performs interference avoidance to avoid interference from transmissions of signals of the second wireless technology to reception of signals of the first wireless technology if the first set of measurements indicates interference due to transmission of signals of the second wireless technology by the wireless terminal.

10 Claims, 6 Drawing Sheets

(56) References Cited

U.S. PATENT DOCUMENTS

| | | | |
|---|---|---|---|
| 7,734,253 B2 | 6/2010 | Chen et al. | |
| 2002/0142779 A1* | 10/2002 | Goto et al. | 455/450 |
| 2002/0160785 A1* | 10/2002 | Ovesjo et al. | 455/453 |
| 2004/0047312 A1 | 3/2004 | Muszynski et al. | |
| 2006/0068815 A1* | 3/2006 | Caspi | H04W 88/06 455/466 |
| 2007/0224935 A1* | 9/2007 | Waxman | 455/41.2 |
| 2009/0005029 A1* | 1/2009 | Wang et al. | 455/423 |
| 2009/0073922 A1* | 3/2009 | Malladi | H04L 1/0004 370/328 |
| 2009/0219893 A1 | 9/2009 | Korpela et al. | |
| 2009/0262785 A1* | 10/2009 | Wilhelmsson | 375/133 |
| 2009/0270103 A1 | 10/2009 | Pani et al. | |
| 2009/0303975 A1 | 12/2009 | Xhafa et al. | |
| 2009/0323652 A1 | 12/2009 | Chen et al. | |
| 2010/0029325 A1 | 2/2010 | Wang et al. | |
| 2010/0035545 A1 | 2/2010 | Ibrahim et al. | |
| 2010/0061326 A1* | 3/2010 | Lee et al. | 370/329 |
| 2010/0137025 A1 | 6/2010 | Tal et al. | |
| 2010/0197235 A1 | 8/2010 | Wilhelmsson | |
| 2010/0290435 A1* | 11/2010 | Kazmi | 370/332 |
| 2010/0317291 A1* | 12/2010 | Richardson | 455/63.1 |
| 2010/0323711 A1* | 12/2010 | Damnjanovic et al. | 455/450 |
| 2011/0058510 A1* | 3/2011 | Thomas | H04W 52/0216 370/311 |
| 2011/0242969 A1* | 10/2011 | Dayal et al. | 370/225 |
| 2011/0243094 A1* | 10/2011 | Dayal et al. | 370/331 |
| 2011/0256834 A1* | 10/2011 | Dayal | H04W 16/14 455/67.7 |
| 2013/0083672 A1* | 4/2013 | Johansson | H04W 72/082 370/252 |

OTHER PUBLICATIONS

3GPP TSG RAN WG2 #73bis, "Triggering of Actions related to In-device Coexistence" Motorola Mobility, Shanghai, China, Apr. 11-15, 2011, 3 pages.

Patent Cooperation Treaty, "PCT Search Report and Written Opinion of the International Searching Authority" International Application No. PCT/US2011/066484 dated Mar. 9, 2012, 13 pages.

Motorola, "Discussion on FDM approach for in device coexistence," 3GPP TSG-RAN WG2 #72, R2-106475; Nov. 15, 2010.

Motorola, "Discussion on TDM approach for In device coexistence," 3GPP TSG-RAN WG2 #72, R2-106476, Nov. 15, 2010.

CATT; Clarification on the In-device Coexistence Interference Avoidance; 3GPP TSG-RAN WG2 #71, R2-104578; Aug. 16, 2010.

\* cited by examiner

INTERFERENCE MITIGATION IN A DEVICE SUPPORTING MULTIPLE RADIO TECHNOLOGIES COMMUNICATING IN OVERLAPPING TIME PERIODS

FIELD OF THE DISCLOSURE

The present disclosure relates generally to wireless communications and more specifically to operation of a wireless communication terminal that supports multiple wireless technologies.

BACKGROUND

The proliferation of wireless technologies is leading to wireless terminals that incorporate different modems for multiple wireless interfaces. In many situations it is necessary to operate two or more of wireless interfaces simultaneously. Depending on the operating frequencies of the wireless interfaces, the terminal can experience interference due to the simultaneous operation of the wireless interfaces. Specifically, the transmitting signals on one interface results in interference being experienced in the reception of signals on the other interface. This problem is commonly known as "Interference due to In-device Coexistence" of multiple interfaces.

This problem has been discussed in 3GPP specifically for the coexistence of 3GPP LTE with certain technologies that operate in the Industrial-Scientific-Medical (ISM) band. Of particular interest are situations where the LTE frequency band is adjacent to the ISM band. For example, TDD LTE band 40 (2300-2400 MHz) and FDD LTE Band 7 (uplink) are adjacent to the ISM band (2400-2483.5 MHz). The ISM band is available for unlicensed operation. Technologies that operate in the ISM band include IEEE 802.11 (also known as "WLAN" or "WiFi") and IEEE 802.15 and its variants (popularly known as Bluetooth). Some studies have shown that the interference that occurs between band 40 and the ISM band is severe. Such coexistence interference scenarios may also occur due to second harmonics of radio access technologies (RATs) supporting uplink transmissions in the 2.5-2.9 GHz bands (e.g., LTE Band 7, Band 38, LTE TDD in 2600 MHz for US) and 5 GHz ISM band systems such as WLAN.

As indicated in 3GPP technical document RP-100671, the problem cannot be remedied solely using RF filters as filter technology does not provide sufficient rejection of adjacent frequencies. 3GPP has launched efforts to study solutions to this problem.

Therefore a need is seen for methods and apparatus that eliminate or reduce the coexistence problems described above while ensuring reasonable operating efficiency.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Several embodiments are disclosed to address problem of coexistence of a first wireless technology and a second wireless technology in the same device. The first wireless technology can be a cellular technology such as LTE or UMTS. The second wireless technology can be a WiFi technology such as IEEE 802.11 or a personal area network technology such as Bluetooth. The methods can be used in wireless communication systems with one or more wireless terminals, wherein the wireless terminals comprise a transceiver for the first wireless technology and a second transceiver for the second wireless technology.

Some of the embodiments are directed at wireless communication systems and terminals wherein the first wireless technology is a cellular or wide area networking technology such as LTE, and the second wireless technology is a short range wireless technology such as IEEE 802.11 WLAN (WiFi) or Bluetooth (BT). Some of the embodiments are particularly suited for wireless terminals with WiFi transceivers that are configured to provide WiFi Access Point (AP) functionality. Other embodiments are particularly suited for wireless terminals with WiFi transceivers that are configured to function as WiFi Stations (STA).

It should be understood by one skilled in the art, that although some of the embodiments are described in terms of in-device coexistence interference to/from WiFi and/or BT, the embodiments described are applicable to other in-device wireless technologies that may be present in the wireless terminal such as short range WPAN (e.g., Zigbee), GPS, etc.

According to one embodiment, the cellular transceiver is configured to perform a measurement of the cellular channel when the WiFi or BT transmission is occurring. More particularly, the cellular transceiver operating on a first frequency performs the measurement when the WiFi or BT transceiver is transmitting. The cellular transceiver performs filtering of the measurements and sends a measurement report to the cellular base station. Alternatively, no filtering or limited filtering based on a subset of the measurements is performed by the wireless terminal device which is reported to the cellular base station. In some instances, the measurements reflect interference caused by the WiFi or BT transmission to the reception of the cellular signal. The base station can determine, based on the measurements reported in the measurement report, whether to perform an inter-frequency handover of the cellular transceiver to a second cellular frequency. The cellular transceiver when operating on the second frequency can experience lower interference from WiFi or BT transmissions than when operating on the first frequency. The measurements performed may be radio resource management (RRM) measurements or radio link monitoring (RLM) measurements. These and other aspects of this embodiment are described further below.

In another embodiment, the wireless terminal decides whether to trigger a coexistence interference avoidance mechanism or not and which coexistence avoidance mechanism will be used. Initially, both transceivers in the device are operated simultaneously without any restriction. The cellular transceiver performs measurements on a serving cell related to received signal strength/quality such as reference signal received power (RSRP) and reference signal received quality (RSRQ), and evaluates channel quality indications (CQI) for downlink subframes where WiFi or BT transceiver transmits data, in order to assess the coexistence interference level. Alternatively, the wireless terminal can predict the interference level based on prior WiFi/BT transmission measurements, characteristics of the WiFi/BT transmission, a priori known WiFi/BT transmission impacts such as sensitivity loss, SINR degradation, increased noise floor, etc. or a combination of the above. If RSRP is lower than a threshold value $T_1$ and the average of the corresponding CQIs is lower than a threshold value $T_2$ or the x % of the corresponding CQIs are lower than a threshold value $T_3$ then the wireless terminal decides to trigger a coexistence interference avoidance mechanism. The threshold values may be higher layer signaled to the wireless terminal, i.e., higher-layer or RRC configured or may be based on the RSRP, RSRQ or CQI evaluated on recent DL subframes (e.g., within +/-N ms) of WiFi/BT activity. Alternatively, if the degradation in the LTE signal quality (e.g., RSRP, RSRQ, CQI etc.) on subframes with at least a portion of WiFi/BT activity compared to subframes without WiFi/BT activity, individually or after filtering is above a threshold, the wireless terminal can determine to trigger an avoidance mechanism (when LTE is active—RRC-connected). In some embodiments, lower than or above a threshold can further include the case of equal to the threshold. These and other aspects of this embodiment are described more fully below.

If the wireless terminal decides to trigger a coexistence interference avoidance mechanism and multiple carrier-frequencies or RATs are available, then the wireless terminal decides which solution to employ based on inter-frequency/inter-RAT measurements, LTE status (idle or connected), WiFi role (AP or STA), BT role (master or slave) and LTE traffic types. One embodiment is that if RSRPs on other available carrier-frequencies are much lower than RSRP on the serving cell frequency, then time division multiplexing (TDM) of the cellular and WiFi/Bluetooth activities is preferred. If the interfering technology is WiFi AP or BT master, then inter-frequency or inter-RAT handover is preferred in some embodiments. If there are other channel frequencies where RSRPs are higher than a threshold value, then a handover to the other channel is preferred. If a cellular transceiver has voice traffic, then an inter-RAT handover is preferred. These and other aspects of this embodiment are described further below.

According to another implementation, the cellular base station adaptively modifies the scheduling of data for the wireless terminal based on possible WiFi/BT transmission activity. Specifically, the cellular base station can modify its schedule so that data to be transmitted to the wireless terminal through the cellular interface is delayed until all or most of a burst of WiFi/BT transmission activity is completed. The cellular transceiver can be configured to measure the channel quality and send channel quality indications (CQI) to enable data to be scheduled for the wireless terminal on the cellular connection. Additionally, the wireless terminal can indicate whether WiFi/BT transmission was occurring when the channel quality measurement was made. This indication can be transmitted concurrently with the CQI. For example, the uplink control information can include both the CQI and the indication of whether WiFi transmission duration overlapped (partly or completely) the duration of the channel quality measurement. Based on the reported channel quality and the indication of whether a WiFi/BT transmission overlapped the channel quality measurement, the cellular base station can adopt a schedule that minimizes loss of transmissions to the wireless terminal. For example, a low channel quality and an indication that WiFi/BT transmission occurred at the time of the channel quality measurement can indicate to the base station that the low channel quality may be due to WiFi/BT transmission. The base station can then delay transmission of user data until it receives an indication of high channel quality or until it receives an indication that WiFi/BT transmission did not overlap in time the channel quality measurement. These and other aspects of this implementation are described further below.

According to another embodiment, the cellular base station modifies retransmission of uplink packets based on possible overlap of the uplink transmissions and WiFi/BT reception at the wireless terminal. For example, the WiFi/BT transceiver in the wireless terminal may support a WiFi station/BT slave function. The wireless terminal can indicate to the base station that a planned WiFi/BT reception at the WiFi/BT transceiver can overlap in time a planned uplink transmission or retransmission of a packet on the cellular interface. The WiFi reception can be for receiving critical information from a WiFi access point, such as a WiFi beacon. Based on this indication, the base station can reschedule the uplink transmission that is expected to overlap the WiFi/BT transmission to occur after the WiFi/BT transmission is completed. For example, in LTE, the base station can receive a first transmission of a packet from the wireless terminal and concurrently an indication that the retransmission of the packet is expected to overlap a planned WiFi/BT reception. The base station may not be able to decode the packet and may need one or more retransmissions of the packet in order to correctly decode it. The base station can acknowledge the packet although it has not been decoded correctly. The wireless terminal can keep the packet in its uplink buffer. The base station can then schedule an adaptive uplink retransmission to occur after the expected time of completion of the planned WiFi/BT transmission. These and other aspects of this implementation are described further below.

According to another embodiment, the cellular base station can modify transmission and retransmission of downlink packets based on possible overlap of the downlink transmissions and planned WiFi/BT transmission at the wireless terminal. For example, the WiFi/BT transceiver in the wireless terminal may support a WiFi access point/BT master function. The wireless terminal can indicate to the base station that a planned WiFi/BT transmission is expected to occur at a particular time. The planned WiFi transmission can be a beacon transmission or any other critical transmission. If the planned WiFi/BT transmission is periodic, the wireless terminal may additionally indicate the periodicity of the planned WiFi/BT transmission, and the base station can identify further timings for overlapped transmission. If the WiFi AP in the wireless terminal has buffered multicast/broadcast data frames and a beacon with a delivery traffic indication message (DTIM) is scheduled for transmission, the wireless terminal can inform the base station of the scheduled multicast/broadcast data transmission following DTIM. The wireless terminal may also be configured to perform and report radio resource management (RRM)

measurements to the base station. The base station can use the RRM measurements to determine whether to reschedule any downlink transmission that was scheduled to overlap with the WiFi/BT transmission. For example, if the RRM measurements indicate a high signal level for the base station signal, then the wireless terminal may be able to receive and decode transmissions from the base station even if the planned WiFi/BT transmission overlaps the transmission from the base station. The base station may determine that it does not need to reschedule downlink transmissions that overlap the planned WiFi/BT transmission if the RRM measurements indicate that the base station signal is above a threshold. The base station may determine that it needs to reschedule downlink transmissions that overlap the planned WiFi/BT transmission if the RRM measurements indicate that the base station signal is below the threshold. Furthermore, the RRM measurement threshold below which the wireless terminal is unable to receive downlink transmissions concurrently with the planned WiFi/BT transmissions can depend on the physical characteristics of the wireless terminal such as antenna isolation, transmit and receive filters, etc. Therefore, the wireless terminal may additionally report the RRM measurement threshold to the base station to enable the base station to determine whether to reschedule certain downlink transmissions. These and other aspects of this implementation are described further below.

In one embodiment, a WiFi transceiver in the wireless terminal is operated as a WiFi AP, the wireless terminal selects a beacon size and a modulation and coding scheme (MCS) of a beacon such that beacon transmission can be completed within 1 ms. For 1 Mbps transmission rate with 500 Byte beacon, the required time for beacon transmission is 4 ms. The WiFi AP can reduce the beacon size and the beacon transmission time by not supporting optional capabilities/features and choosing medium or high MCS for beacon, respectively. Mechanisms to reduce Beacon transmission duration include barring access to 802.11b devices thus resulting in smaller PHY preambles (20 us OFDM v/s ~100 us for 802.11b DSSS) for frame transmission, transmitting beacon MAC PSDU at a rate higher than the lowest rate of 1 Mbps (typically used for backwards compatibility of legacy 802.11b devices), e.g., one of the mandatory 802.11b supported rates (2, 5.5, 11 Mbps) or 802.11g supported rates (6, 12, 24 Mbps). These and other aspects of this implementation are described further below.

Another embodiment is that for a wireless terminal with a configured Discontinuous Reception (DRX) cycle and with a WiFi transceiver operated as a WiFi AP, the beacon transmission can be made to occur in the DRX off-duration, e.g., towards the middle-to-end of the off-duration to allow for the on-duration extension of the cellular transceiver. If the wireless terminal detects a potential collision of a cellular reception with a new future beacon transmission (within the DRX cycle) resulting in potentially unacceptable interference levels, the wireless terminal can request a downlink gap to the base station. Alternatively, the cellular transceiver can degrade the feedback channel quality (e.g. CQI) to prevent the base station from scheduling downlink transmission during the interfering WiFi beacon transmissions. These and other aspects of this implementation are described further below.

According to another embodiment, the UE determines that WiFi/BT transmissions interfere with LTE. A UE performs measurements of the LTE signal with a periodicity that meets certain requirements. If an LTE UE is configured with DRX, the requirements for performing measurements can be relaxed. That is, the UE can perform measurements of the LTE signal less frequently if it is configured with DRX, depending on the DRX parameters. This relaxation is to ensure that the power consumption savings that are obtained by configuring DRX are not overridden by requirements to perform frequent measurements. If the UE is configured with DRX, it may be required to perform measurements with a first periodicity. In response to the WiFi/BT transceiver being activated, the UE performs measurements more frequently than the first periodicity, even if DRX is configured. Performing measurements more frequently enables the UE to determine interference that occurs when WiFi/BT transmissions are performed. Thus, the UE can recognize interference earlier than if it were following the first periodicity for measurements. These and other aspects of this implementation are described more fully below.

According to another method, time division multiplexing of the first wireless technology and the second wireless technology can be achieved without significant modification of the scheduling algorithm at the base station. If the wireless terminal adopts a TDM solution, the second wireless transceiver can transmit/receive when the cellular transceiver is in DRX "Off Duration" and in measurement gap (For LTE, 6 ms gap in every 40 ms for Gap Pattern 0, or 6 ms gap in every 80 ms for Gap Pattern 1). The measurement gap is configured for inter-frequency/inter-RAT measurements, and at least one inter-RAT would be available for most deployment scenarios. If the cellular transceiver is operated in time division duplex (TDD) mode, the second wireless transceiver can transmit/receive opportunistically during DRX "On Duration" of the cellular transceiver. If the wireless terminal adopts a TDM solution and a cellular transceiver is in DRX "On Duration", the second transceiver can receive during reception of the cellular transceiver, and can transmit during transmission of the cellular transceiver. Further, the second transceiver can receive during any uplink subframe in which the cellular transceiver does not have a grant to transmit, and can transmit in downlink subframes if the cellular transceiver is not scheduled.

If the wireless terminal adopts a TDM solution, the second wireless transceiver as a WiFi AP can send a CTS-to-self frame as late as possible in the current measurement gap but before the end of current measurement gap to avoid WiFi packet losses in the following active time of the cellular transceiver. Since the maximum allowed duration for reserving the medium is 32.768 msec, the AP may send a CTS-to-self frame with a small duration value several times within the active time in order to protect signal reception of the cellular receiver.

If the wireless terminal adopts a TDM solution, the TDD cellular transceiver is in DRX "On Duration", and the second transceiver as a WiFi AP has data to send, then the AP sends CTS-to-self in the uplink transmission region of the cellular transceiver which makes all STAs in the basic service set (BSS) not transmit by setting network allocation vector (NAV) to the length of uplink subframes (1 ms-3 ms). If the medium is busy, then CTS-to-self transmission is delayed but no later than the timing of (the starting time of the following TDD downlink subframes—duration of CTS-to-self frame—SIFS—duration of the first frame to be sent). If a data frame at the AP is longer than the uplink duration or if the uplink duration available to the AP is shorter than the transmission time for one data packet, the AP has to wait until the next uplink transmission time, the next DRX "Off Duration", or the next measurement gap period of the cellular transceiver.

If the wireless terminal adopts a TDM solution and the TDD cellular transceiver is in DRX "On Duration", the second transceiver as a WiFi AP buffers data frames during downlink transmission of the cellular transceiver. Furthermore, the AP responds to PS-poll only if the timing of (the time when the PS-poll is received+SIFS) corresponds to uplink transmission. Since Probe Response frames are sent using normal frame transmission rules, the AP delays Probe Response until the next uplink subframe. Alternatively, if RSRP in the cellular receiver is larger than a threshold, the AP may be allowed to send an ACK frame during downlink transmission of the cellular transceiver. Since an ACK frame has 14 bytes, ACK transmission would make an impact on one or two downlink OFDM symbols.

If the second wireless transceiver is operated as a 5 GHz WiFi AP, to reduce the impact of the second-order harmonic interference of uplink transmission of the cellular transceiver in ~2.5 GHz band on the WiFi AP reception, the AP can power control the (802.11h supported) STA to transmit at a higher transmit power. Alternatively, the AP can schedule Quiet periods overlapping with the "On Duration" of the DRX cycle creating intervals in the WiFi BSS where all stations do not transmit.

If the wireless terminal adopts a TDM solution and the cellular transceiver is in a connected mode, the second wireless transceiver as a WiFi STA is set to the WiFi power save mode. Furthermore, the STA uses a PS-poll mechanism to retrieve data packets buffered at a WiFi AP. If a target beacon transmission time (TBTT) of the first Beacon frame scheduled for transmission after the time corresponding to the last TBTT plus the STA's current ListenInterval is in a measurement gap or DRX "Off Duration", then STA wakes up early enough to receive the first Beacon frame scheduled for transmission after the time corresponding to the last TBTT plus the STA's current ListenInterval. If a traffic indication map (TIM) indicates that there are buffered frames at the AP, then the STA uses the PS-poll mechanism to retrieve buffered data. The STA goes back to the sleep state when DRX "On Duration" of the cellular transceiver starts or a measurement gap ends as long as there are no more buffered data at the AP. If there are more buffered data at the AP and the remaining DRX duration or the remaining measurement gap length, before the next LTE "On Duration" starts, is not long enough to complete another data retrieval by PS-poll mechanism, then the STA stays awake and delays sending a PS-poll until the next LTE DRX "Off Duration" or the next measurement gap starts. In addition, the STA can send PS-poll opportunistically at the timing of (the start time of the next downlink subframes—SIFS) while the cellular transceiver is active. If RSRP is larger than a threshold, the STA may be allowed to send ACK during downlink transmission. If a TBTT of the first Beacon frame scheduled for transmission after the time corresponding to the last TBTT plus the STA's current ListenInterval is in LTE "On Duration", the STA wakes up one or more beacon intervals earlier and stays awake for reception of three or more consecutive beacons. Since any counter such as a Quiet period, channel change, etc. will normally be signaled for several beacons ahead of the event, the STA can avoid missing important messages from the AP due to poor beacon reception by reading multiple beacons in a row. In case that the STA erroneously decodes a TIM due to the high interference from the cellular transceiver and sends a PS-poll although the AP has no data for the STA, the AP would respond with a Null-frame. If the STA has data to send the AP, the STA wakes up and sends data during LTE DRX "Off Duration" or measurement gap.

If the wireless terminal adopts a TDM solution and the cellular transceiver is in an idle mode, the second wireless transceiver can transmit/receive most of the time. However, the second wireless transceiver cannot transmit when the cellular transceiver monitors downlink for paging reception. In LTE, when DRX is used, the wireless terminal needs only to monitor one Paging Occasion (PO) per DRX cycle. Thus, the second wireless transceiver is restricted not to send any ACK, PS-Poll, and data frame at least one PO per DRX cycle.

According to another embodiment, a Bluetooth (BT) transceiver in the wireless terminal can be operated with the cellular transceiver through time- or frequency-division multiplexing.

When the wireless terminal has a cellular call transferred to a BT headset, BT is preferably using SCO/eSCO synchronous connection-oriented in HFP profile connection by periodically reserving slots (625 us long). The wireless terminal is in master configuration and the BT headset is in slave configuration. As the BT slots are smaller relative to LTE subframe length, one method (time-domain) for reducing interference on the wireless terminal BT reception (a BT headset is typically low power class—BT power class 2 with max 4 dBm transmit power) from LTE uplink transmission is to reserve BT slots in the downlink portion of the LTE TDD 5 ms/10 ms switch-periodicity radio frame. As the wireless terminal is the BT master, the BT master can reserve the slots in the LTE downlink portion (there are 8 BT slots in 5 ms) and also further align the first received BT slot (odd slot) with the $1^{st}$ downlink LTE subframe. The slave (BT headset) is clock synchronized to the wireless terminal master. As the BT transmissions are low power, the impact of the BT transmission interference on LTE reception is expected to be small. When the wireless terminal does audio streaming to a BT headset using A2DP profile, asynchronous connection-oriented connection (ACL) is used with the wireless terminal being the master. With the time-domain mechanism, the BT master can schedule the audio packet transmission such that the acknowledgement packet from the slave headset is received in downlink subframes.

In addition or in place of the mechanisms above, BT supports adaptive frequency hopping, and thus by using BT adaptive FH feature, BT channels at least 20 MHz away from LTE Band 40 can be used, without placing any restrictions/constraints on the BT slot assignments.

Figure 1:
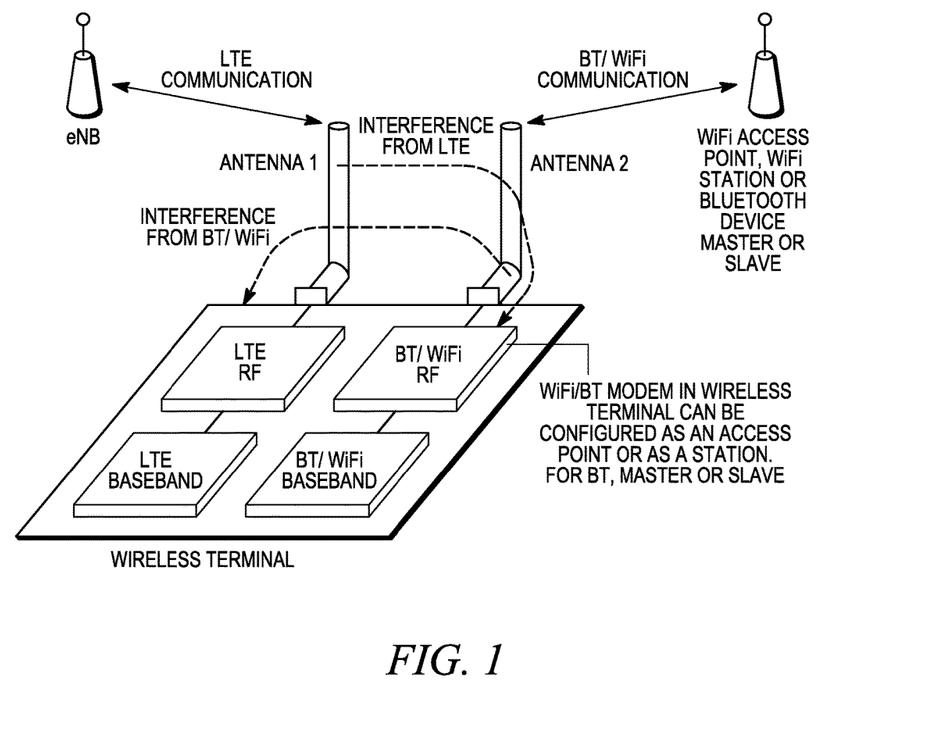
FIG. 1 illustrates a wireless terminal with two transceivers, which can experience interference due to in-device coexistence.

FIG. 1 illustrates a wireless terminal equipped with a 3GPP Long Term Evolution (LTE) radio and a WiFi/Bluetooth radio. As shown, the wireless terminal includes RF and base band components for LTE and at least one of WiFi and Bluetooth. The LTE radio is also referred to as the User Equipment (UE) or by other terminology used in the art. The WiFi radio (if present) can be configured to function as a WiFi Access point in which case other WiFi devices can associate with it. Such a configuration can be used to provide a WiFi hotspot with the LTE link as the backhaul. Alternatively, the WiFi radio can be configured to function as a regular device (also referred to as a WiFi station). As shown, transmissions by the LTE radio can cause interference to the WiFi/Bluetooth reception, and WiFi/Bluetooth transmissions by the WiFi/Bluetooth radio can cause interference to the LTE reception.

Several methods and embodiments are described herein to mitigate the in-device coexistence interference. The methods are described using LTE and WiFi as the technologies implemented in the wireless terminal. However, it should be apparent that the methods are equally applicable if the wireless terminals implement other wireless communication technologies or protocols. The wireless terminals may implement any combination of LTE, WiMax, WiFi, Bluetooth, GPS, UMTS, GSM or any other wireless transmission or reception technologies. Furthermore, although the methods are described in terms of coexistence of two technologies, it should be apparent that the same methods can be adapted to wireless terminals and systems that involve coexistence of three or more technologies.

Some of the embodiments involve avoiding the in-device coexistence interference by changing the operating frequency of one of the technologies, so that there is a larger frequency separation between the operating frequencies of the two technologies. Other embodiments involve avoiding the overlap of transmissions on one technology with reception on another technology. Accordingly, some embodiments involve adapting the downlink transmission schedules to avoid such overlap. Other embodiments involve adapting uplink transmission schedules to avoid such overlap.

Figure 2:
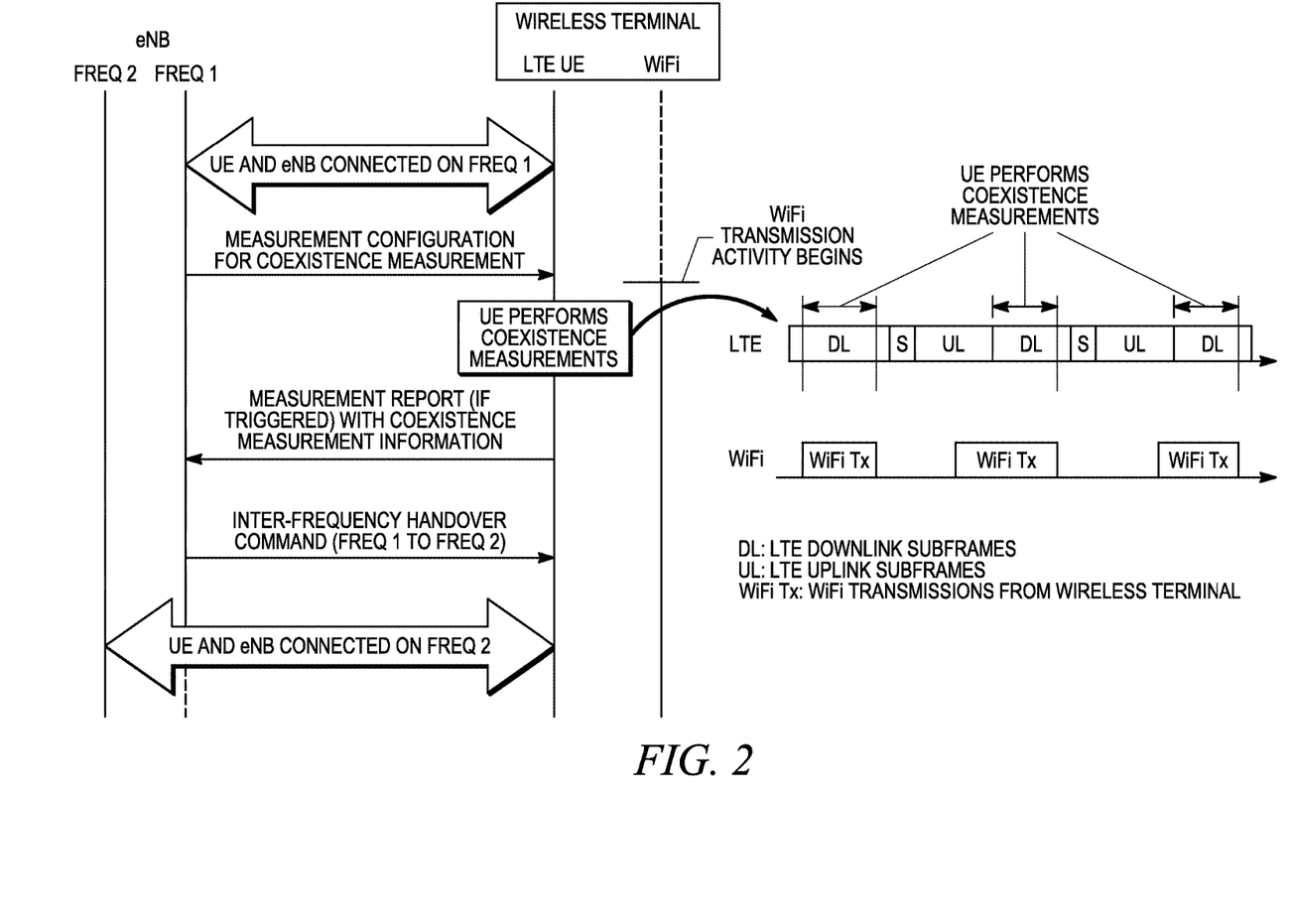
FIG. 2 illustrates a process for avoiding interference due to in-device coexistence by changing the operating frequencies of operation of one of the transceivers.

According to a first embodiment illustrated in FIG. 2, an inter-frequency handover is performed to move the LTE frequency on which the wireless terminal operates away from the WiFi operating frequency. The UE and the eNB are connected on frequency 1. The eNB configures the UE to perform measurements during periods when the WiFi/BT radio in the wireless terminal is transmitting. Such measurements are referred to herein as coexistence interference measurements. The UE avoids performing the coexistence interference measurements when the WiFi/BT radio in the wireless terminal is not transmitting. That is, the measurement periods of the coexistence interference measurements substantially overlap the periods of WiFi/BT transmission by the WiFi/BT radio. The measurements can reflect the interference caused by the WiFi/BT transmission to the LTE reception. Additionally, the UE can perform the measurements only in periods that comprise LTE downlink subframes and WiFi/BT transmission is occurring. The UE can also filter the measurement samples to obtain a filtered measurement value. A configuration of measurements for coexistence interference can be in addition to other measurement configurations in the UE for performing measurements not related to determining coexistence interference.

The measurement configuration can include parameters for generating and transmitting measurement reports that include coexistence interference information. For example, the configuration can include a threshold level. The UE can report measurements only if they are higher than the threshold level. The UE can compare the filtered measurement value to the threshold level, and if the filtered measurement value is higher than the threshold level, transmit a measurement report to the eNB.

The quantity to be measured can be a radio resource measure such as Reference Symbol Receive Power (RSRP) or Reference Symbol Receive Quality (RSRQ). The quantity can also be measure of the radio link quality such as Block Error Rate or Frame Error Rate. The quantity can also be a radio link monitoring measurements such as a block error rate of a hypothetical control channel.

Upon receiving the measurement report, the eNB can determine if the reported measurements indicate significant interference to LTE signal reception from the WiFi/BT transmission at the UE. Such a determination can be performed by comparing the measurements to a threshold. If the measurements indicate significant interference, then the eNB can perform a handover of the UE to frequency 2. Frequency 2 can be chosen by the eNB such that the interference to frequency 2 from WiFi/BT transmissions is minimal. Alternatively, the determination that the reported measurements indicate significant interference to the LTE signal reception from the WiFi transmission at the UE are performed by comparing the measurements to other measurements that are not coexistence interference measurements. For example, measurements during periods that are not restricted to periods of WiFi transmission by the wireless terminal occurs.

In a similar embodiment, the WiFi/BT radio can perform measurements when the LTE radio is performing uplink transmissions. Such measurements can be link quality measures such as frame error rate or other radio measurements on the WiFi/BT interface. The measurements can be transferred from the WiFi/BT radio to the LTE radio and reported to the eNB. The measurements can reflect the interference caused by the LTE transmission to the WiFi/BT reception. Upon receiving the measurements, the eNB can determine if the LTE transmission is causing significant impact to the WiFi/BT interface. If the measurements indicate significant interference, the eNB can perform a handover of the UE to frequency 2. Frequency 2 can be chosen by the eNB such that the interference to the WiFi/BT operating frequency from transmissions on frequency 2 is minimal.

Figure 3:
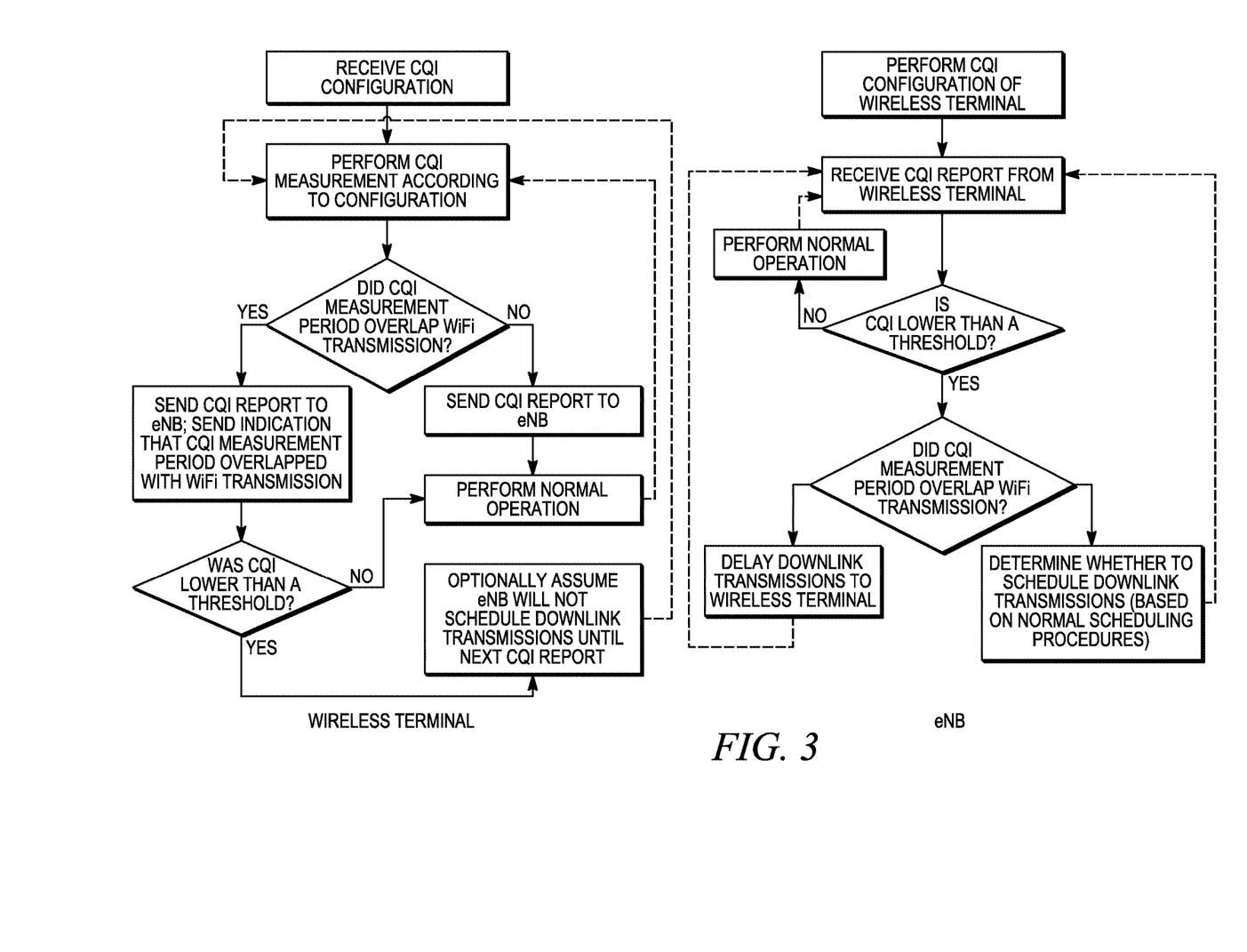
FIG. 3 illustrates a process for avoiding interference due to in-device coexistence based on using channel state information.

According to another embodiment illustrated in FIG. 3, the LTE eNB can modify times at which it schedules data for the wireless terminal based on possible WiFi/BT transmission activity. At a first step, the UE can be configured to report channel quality indications (CQI). CQI provides the base station information about the channel conditions. CQI can also indicate to the base station the modulation and coding necessary for transmission to the UE with a low probability of error. The CQI configuration can indicate whether the UE should perform a wideband measurement or a sub-band measurement. The UE can perform the channel quality measurement according to the configuration over a first time duration. The wireless terminal can then determine whether one or more WiFi/BT transmissions by the WiFi/BT radio occurred during the first time duration. The wireless terminal can determine this by communication and coordination between the LTE radio and WiFi/BT radio. If the channel quality measurement period substantially overlapped one or more WiFi/BT transmissions, the UE can transmit the CQI to the eNB and also transmit an indication that the measurement period corresponding to the CQI overlapped one or more WiFi/BT transmissions. If the wireless terminal determines that the channel quality measurement period did not substantially overlap one or more WiFi/BT transmissions, the UE can transmit the CQI to the eNB. The indication that the measurement period corresponding to the CQI overlapped one or more WiFi/BT transmissions can be transmitted concurrently with the CQI information. According to one further embodiment, it can be transmitted in the same time slot or subframe in which the CQI is transmitted. As a further example, the indication can be included in the uplink control information, which also includes the CQI.

Upon transmitting the CQI and an indication that the measurement period corresponding to the CQI overlapped one or more WiFi/BT transmissions, the UE can assume that the eNB will not attempt any downlink transmissions for a certain period of time. That is, the UE can be implicitly given a reception gap for some duration. Additionally, the UE can assume that the eNB will not attempt any downlink transmissions for a certain period of time only if the CQI was below a threshold. For example, the UE can be implicitly given a reception gap until the time of the next CQI transmission if the reported CQI is below a threshold. The threshold can be signaled by the eNB to the UE in advance of any potentially significant LTE coexistence interference occurrence.

The eNB first configures the UE to perform CQI measurement and reporting. Upon receiving a CQI from the UE, the eNB first determines whether the reported CQI is lower than a threshold. If the CQI is lower than the threshold, the eNB can further determine whether the channel quality measurement period at the UE corresponding to the reported CQI overlapped a WiFi/BT transmission by the WiFi/BT radio in the wireless terminal. An indication from the UE that the measurement period corresponding to the CQI overlapped one or more WiFi/BT transmissions can be used by the eNB to determine that the channel quality measurement period at the UE corresponding to the reported CQI overlapped a WiFi/BT transmission by the WiFi/BT radio in the wireless terminal. Alternatively, the eNB can determine that the channel quality measurement period at the UE corresponding to the reported CQI overlapped a WiFi/BT transmission based on knowledge of planned transmissions by the WiFi/BT radio in the wireless terminal. For example, if the WiFi/BT radio is configured to function as a WiFi/BT access point, it is expected to transmit beacons periodically. The eNB may be aware of the beacon transmission times and can determine whether a CQI measurement period overlapped a beacon transmission. In another example, the WiFi/BT radio can indicate a schedule of planned WiFi/BT transmission activity to the UE, which can then convey this information to the eNB.

According to other embodiments, the eNB can configure downlink gaps on the LTE interface to enable the wireless terminal to perform WiFi transmissions during the gaps. For example, the eNB can configure such gaps in response to an indication from the UE that the WiFi/BT radio is activated, or in response to an indication from the UE that significant WiFi reception activity is expected. Furthermore, the CQI information from the UE can be used to control the duration of such gaps. For example, the eNB can receive at least n indications that the measurement periods corresponding to reported CQIs that overlap with a WiFi/BT transmission. In response to receiving the certain number of indications, the eNB can increase the duration of the downlink gaps. The eNB can increase the length of the gaps only if the reported CQIs indicate a channel quality below a threshold. Furthermore, the n indications that the measurement periods corresponding to reported CQIs overlapped a WiFi transmission can correspond to n successive CQI transmissions. Alternatively, the n indications can correspond to n out of N CQI transmissions. Similarly, the eNB can decrease the duration of the gaps if it receives indications that measurement periods corresponding to one or more reported CQIs did not overlap WiFi transmissions. The increase and decrease of gaps can be done by higher layer signaling (for example, RRC connection reconfiguration messages) or implicitly by the UE and the eNB. For example, if the UE transmits indications that n reported CQIs overlapped WiFi/BT transmissions, then it can implicitly increase the gap duration by a certain number of time slots or subframes. Correspondingly, if the eNB receives indications that n reported CQIs overlapped WiFi/BT transmissions, then it can implicitly increase the gap duration by the same number of time slots or subframes. After a predetermined number of longer duration gaps, the UE and the eNB can revert to a shorter gap pattern.

According to another embodiment, the UE can provide a variety of information about the WiFi/BT activities to enable the eNB to modify scheduling to minimize coexistence interference. According to one example, the UE transmits to the eNB an indication of the buffer status in the WiFi/BT radio. The buffer status indicates whether the amount of data awaiting transmission at the WiFi/BT radio in the wireless terminal is substantial or negligible. The UE transmits the buffer status indication only when the WiFi/BT buffer size exceeds a specified level. Further, the UE indicates the priority level of the data in the WiFi/BT buffer. The buffer status information can indicate to the eNB an approximate degree of interference the LTE downlink reception at the UE can experience due to the WiFi/BT transmissions. Upon receiving an indication that the WiFi/BT buffer size exceeds a specified level, the eNB can postpone scheduling of downlink transmissions for the UE. The eNB also postpones scheduling of uplink transmissions for the UE in response to the buffer status information. According to another example, the UE can indicate to the eNB the expected time at which the WiFi radio in the wireless terminal is likely to poll a WiFi AP for any buffered data. The eNB schedules a downlink transmission gap for the UE to overlap the time at which the WiFi radio is likely to poll the WiFi AP. The eNB can also schedule an uplink transmission gap to encompass a specified duration after the expected time of the polling, during which the WiFi radio can receive data buffered at the WiFi AP. Furthermore, the eNB can schedule the uplink transmission gap only if the UE further indicates that the WiFi AP has buffered data.

Figure 4:
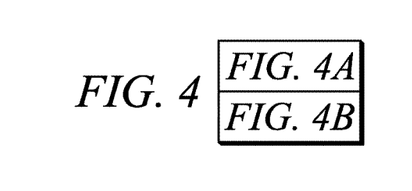
FIG. 4 illustrates a process for avoiding interference due to in-device coexistence by rescheduling certain uplink transmissions.
Figure 4A:
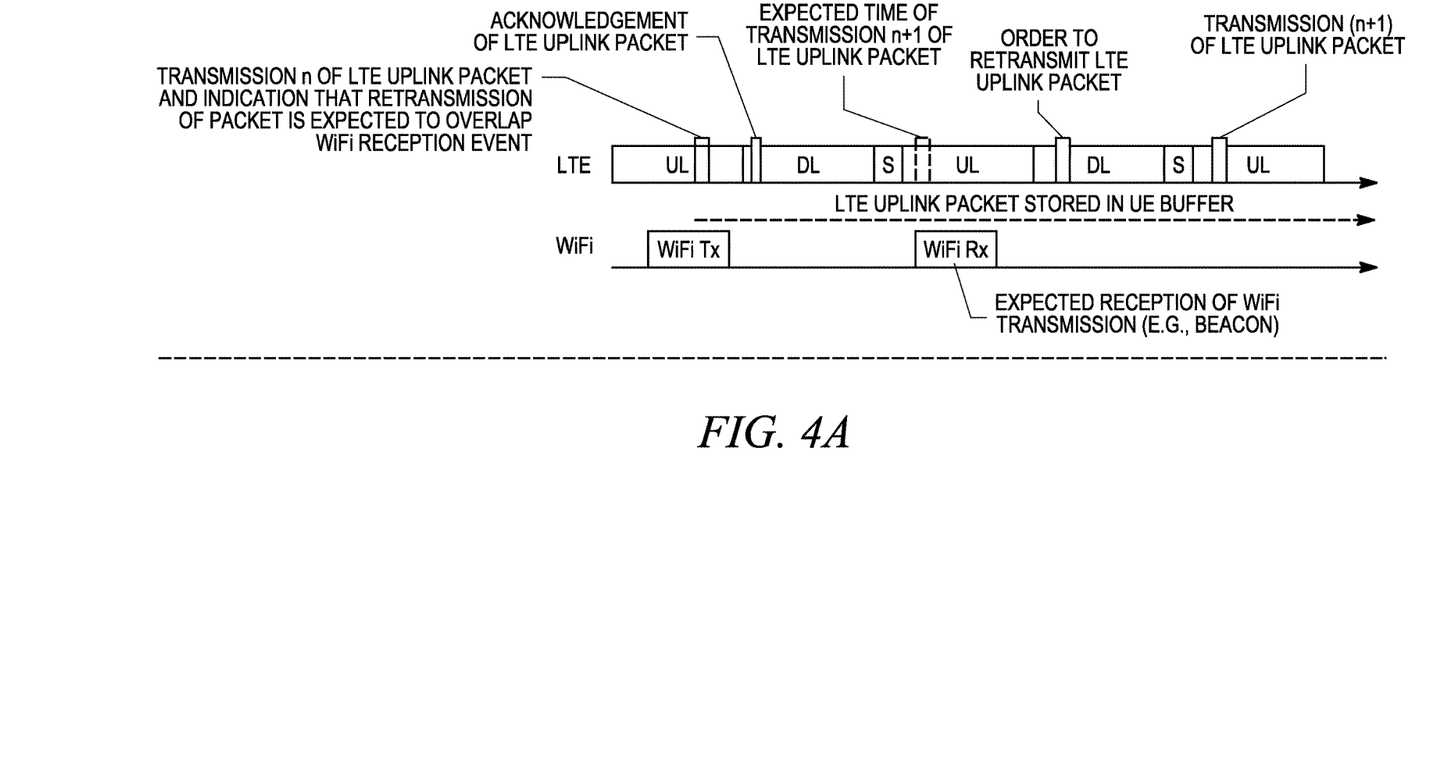
Figure 4B:
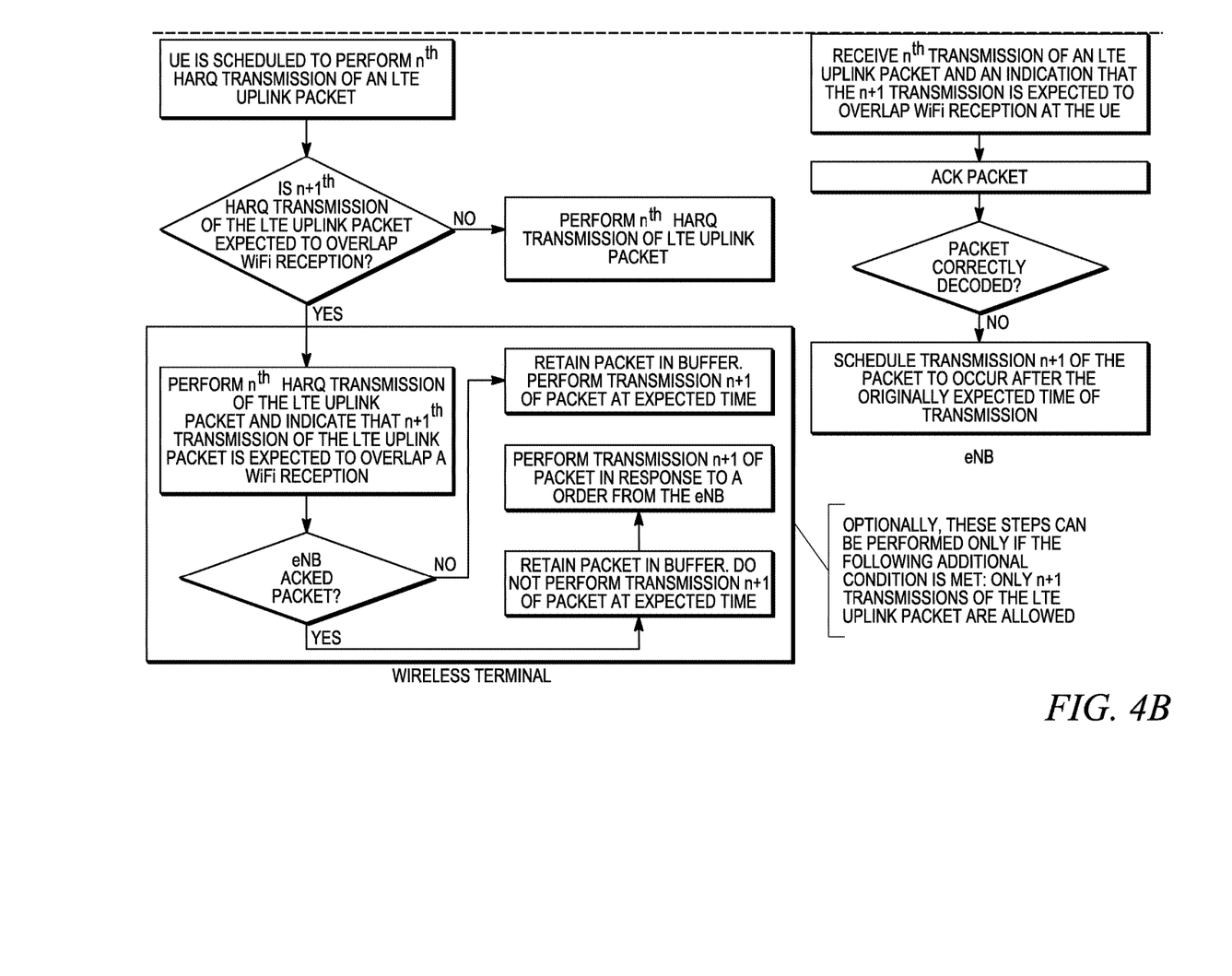
Figure 5:
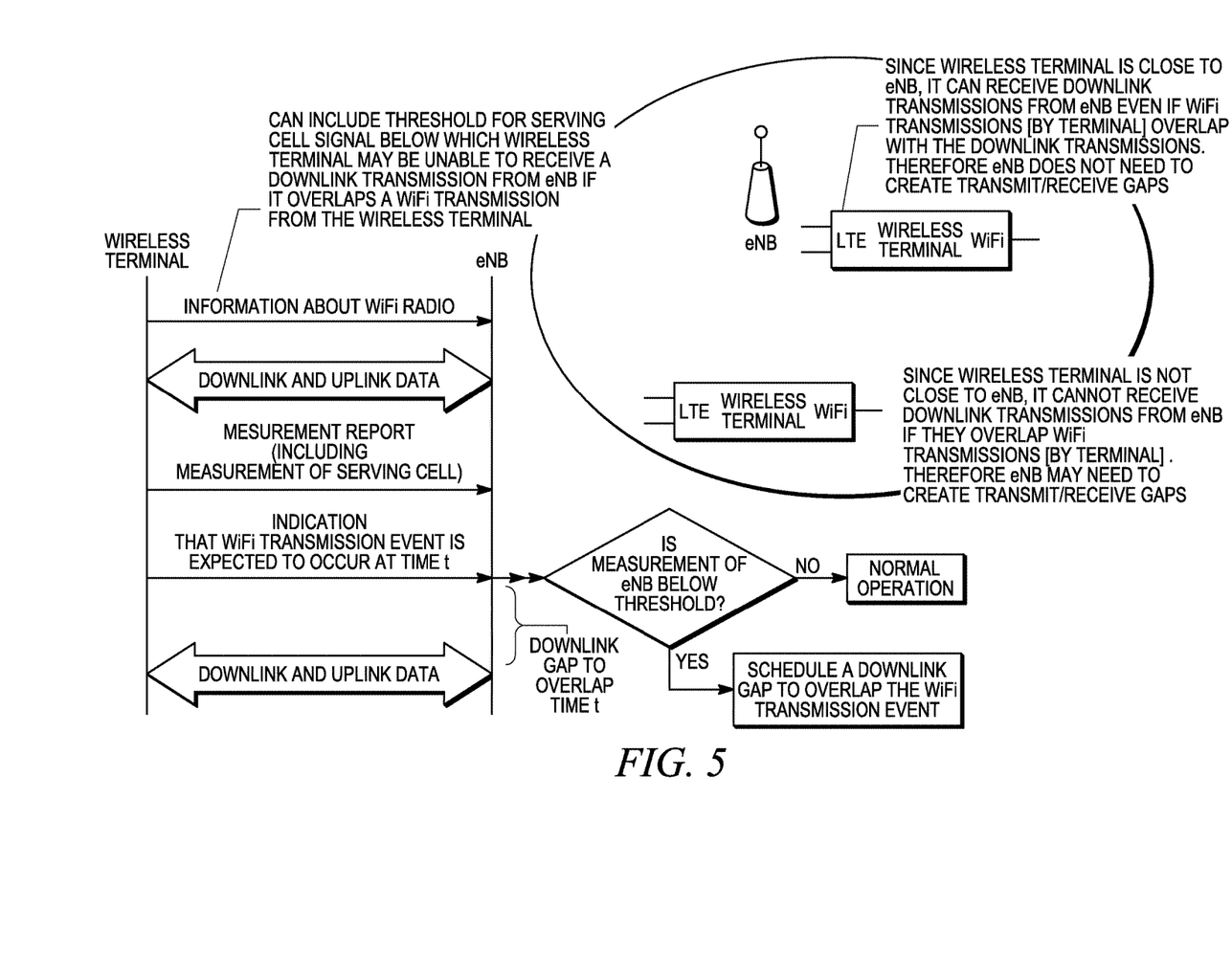
FIG. 5 illustrates avoiding interference due to in-device coexistence by performing interference avoidance if signal conditions of a base station meet certain criteria.

According to the embodiment illustrated in FIG. 4, the LTE eNB modifies retransmission of LTE uplink packets based on possible overlap of the uplink transmissions and WiFi reception at the wireless terminal. At a first step, the UE is scheduled to perform the n-th transmission of an LTE uplink packet. The UE determines whether the n+1-th transmission of the uplink packet is expected to overlap a WiFi reception event. The WiFi reception event may correspond to reception of critical data on the WiFi radio. For example, the WiFi reception event can correspond to reception of a beacon at the WiFi radio. The WiFi reception event can also correspond to reception of other critical messages such as the Delivery traffic indication message (DTIM). If the UE determines that the n+1-th transmission of the uplink packet is expected to overlap a WiFi reception event, it can perform the n-th transmission of the uplink packet and also transmit an indication that the n+1-th transmission of the uplink packet is expected to overlap a WiFi reception event. The indication that the n+1-th transmission of the uplink packet is expected to overlap a WiFi reception event can be transmitted concurrently with the n-th transmission of the uplink packet. For example, the indication can be included in a control channel transmission in the same subframe as the one in which the uplink packet is transmitted. Alternatively, the indication can be transmitted independently of the n-th transmission of the uplink packet. For example, before or after the n-th transmission of the uplink packet. Optionally, the UE can be configured to transmit the indication that the n+1-th transmission of the uplink packet is expected to overlap a WiFi reception event only if the n+1-th transmission is the last allowed transmission of the packet (that is, for example, the UE is allowed only n+1 HARQ transmissions of a packet).

Upon transmitting the uplink packet and the indication that the n+1-th transmission of the packet is expected to overlap a WiFi reception event, the UE may receive an acknowledgement (ACK), a negative acknowledgement (NACK) or no acknowledgement from the eNB. If the UE receives a NACK or no acknowledgement, it performs the n+1-th transmission of the packet as planned. If the UE receives an ACK, it retains the uplink packet in the buffer and delays the n+1-th transmission of the packet preferably until after the WiFi reception event is completed.

The eNB can expect the n-th transmission of an uplink packet in a particular timeslot. The transmission from the UE may or may not be received correctly by the eNB. The eNB can also receive an indication that the n+1-th transmission of the uplink packet may overlap a WiFi reception event. If such an indication is received, the eNB can ACK the uplink packet regardless of whether the packet is decoded correctly. Subsequently, the eNB can order the UE to perform the n+1-th transmission of the packet. In one embodiment, the n+1-th transmission of the packet is scheduled to occur after the WiFi reception event is completed.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless terminal supporting operation on a first wireless technology and a second wireless technology, the method comprising:
   determining, by the wireless terminal, a threshold of a received signal level of a first base station of a first wireless technology,
   wherein the wireless terminal is unable to decode signals of the first base station that overlap transmission of signals of a second wireless technology by the wireless terminal when the received signal level of the first base station is below the threshold; and
   performing interference avoidance to avoid interference from transmissions of signals of the second wireless technology by the wireless terminal to reception of signals from the first base station by the wireless terminal when the signal level of the first base station is below the threshold, comprising performing a handover from the first base station of the first wireless technology to a second base station of the first wireless technology operating on a second frequency distinct from the operating frequency of the first base station; and
   indicating, by the wireless terminal, the threshold to the first base station,
      wherein indicating the threshold to the first base station further includes indicating the threshold only when a transceiver of the second wireless technology in the wireless terminal is active.

2. The method of claim 1 further comprising:
   performing a first set of measurements on a received signal on first operating frequency of the first wireless technology,
   wherein the first set of measurements are performed during time periods that overlap time periods during which the wireless terminal transmits signals of the second wireless technology;
   performing a second set of measurements on a received signal on first operating frequency of the first wireless technology,
   wherein the second set of measurements are performed during time periods that do not overlap time periods during which the wireless terminal transmits signals of the second wireless technology;
   comparing the first set of measurements with the second set of measurements; and
   based on the comparison, sending, by the wireless terminal, an indication of a periodicity of a planned transmission by the wireless terminal where interference may occur.

3. The method according to claim 1 further comprising transmitting one or more measurement reports comprising one or more measurements, the one or more measurement reports including an indication that the measurements were performed during time periods that overlapped time periods during which the wireless terminal transmitted signals of the second wireless technology.

4. The method according to claim 1, wherein the wireless terminal is configured to operate as a Wi-Fi access point and wherein the wireless terminal indicates to the first base station that a planned Wi-Fi transmission is expected to occur at a particular time.

5. The method of claim 1 further comprising:
   performing a first set of measurements on a received signal on first operating frequency of the first wireless technology,
   wherein the first set of measurements are performed during time periods that overlap time periods during which the wireless terminal transmits signals of the second wireless technology;
   performing a second set of measurements on a received signal on first operating frequency of the first wireless technology,
   wherein the second set of measurements are performed during time periods that do not overlap time periods during which the wireless terminal transmits signals of the second wireless technology;
   comparing the first set of measurements and the second set of measurements with a threshold; and
   based on the comparison, sending, by the wireless terminal, a measurement report when any set of measurements is greater than the threshold.

6. The method according to claim 5 wherein the first and second set of measurements measure a reference symbol receive power (RSRP).

7. The method according to claim 5 wherein the first and second set of measurements measure a reference symbol receive quality (RSRQ).

8. A method in a wireless terminal comprising:
   determining, by the wireless terminal, a received signal level threshold for a first base station of a first wireless technology, such that when a received signal level of the first base station is below the received signal level threshold, the wireless terminal is unable to decode received signals of the first base station that overlap the wireless terminal's transmission of signals of a second wireless technology; and
   performing a handover from the first base station of the first wireless technology to a second base station of the first wireless technology operating on a second frequency distinct from the operating frequency of the first base station when the received signal level of the first base station is below the received signal level threshold; and
   indicating, by the wireless terminal, the received signal level threshold to the first base station only when a transceiver of the second wireless technology in the wireless terminal is active.

9. The method of claim 8 further comprising:
   performing a first set of measurements on a first received signal on a first operating frequency of the first wireless technology, wherein the first set of measurements are performed during time periods that overlap time periods during which the wireless terminal transmits signals of the second wireless technology;

performing a second set of measurements on a second received signal on a first operating frequency of the first wireless technology, wherein the second set of measurements are performed during time periods that do not overlap time periods during which the wireless terminal transmits signals of the second wireless technology;

comparing the first set of measurements with the second set of measurements; and based on the comparison, sending, by the wireless terminal, an indication of a periodicity of a planned transmission by the wireless terminal where interference may occur.

10. The method according to claim 8, wherein the wireless terminal is configured to operate as a Wi-Fi access point and wherein the wireless terminal indicates to the first base station that a planned Wi-Fi transmission is expected to occur at a particular time.

* * * * *